Jan. 10, 1928.

A. J. PRANCE

THREAD CUTTING DIE

Filed July 31, 1926

1,655,563

INVENTOR.
Albert J. Prance
BY
Francis D. Hardesty
ATTORNEY.

Patented Jan. 10, 1928.

1,655,563

UNITED STATES PATENT OFFICE.

ALBERT J. PRANCE, OF DETROIT, MICHIGAN, ASSIGNOR TO MURCHEY MACHINE AND TOOL COMPANY, OF DETROIT, MICHIGAN, A CORPORATION OF MICHIGAN.

THREAD-CUTTING DIE.

Application filed July 31, 1926. Serial No. 126,129.

The present invention relates to thread-cutting dies and more especially to improvements on the thread-cutting die forming the subject matter of Letters Patent No. 1,563,108 issued Nov. 24, 1925, to the present applicant.

In the device of the patent, the several chasers are held in their respective grooves by means of a cap piece over the forward end. Therefore, in order to replace any or all of the chasers, it is necessary to remove the cap piece by the removal of several screws.

Among the objects of the present invention is to overcome this difficulty and enable the replacement of the chasers quickly and without use of any other tools and even without removal of the die from the lathe or other machine in which it is being used.

Other objects will readily appear to those skilled in the art upon reference to the accompanying drawings in which:—

Figure 1:
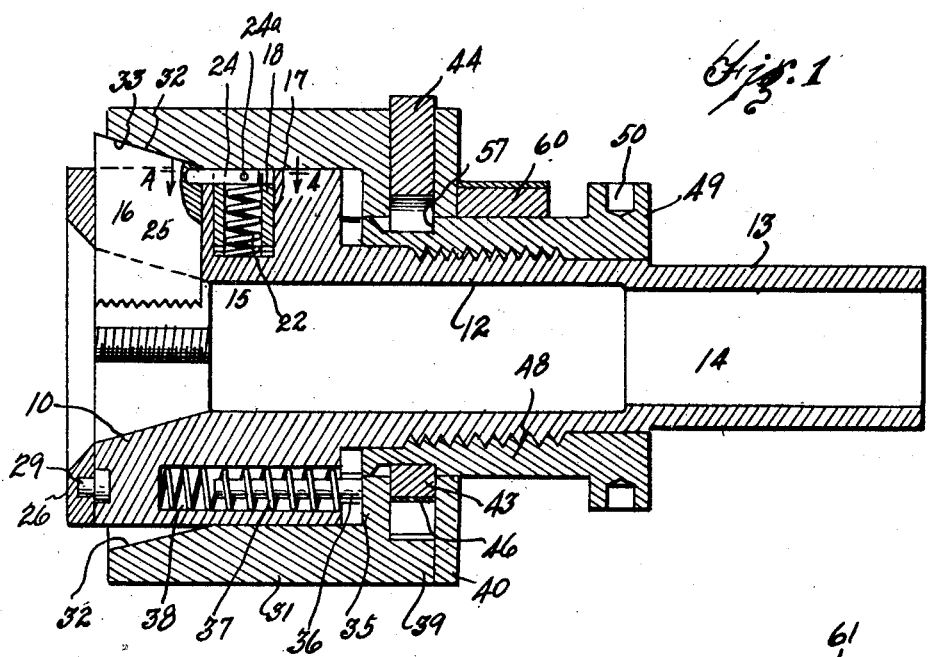
Fig. 1, is a longitudinal section through the die.
Figure 4:
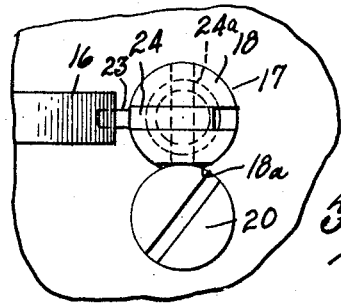
Fig. 4, is a view taken on line 4—4 of Fig. 1.

As in the patent referred to the device consists of a cylindrical body 10 having a threaded extension 12 and a further extension 13 which may be called the shank as it is received in the lathe turret or other support for the die. The central hole 14 permits the work to be acted upon by the chasers for any desired distance. The forward end of the body 10 is formed with rectangular radial grooves 15 for the chasers 16 and with radial round holes 17 for the chaser guides 18 which are hollow cylindrical bodies enclosing springs 22 and carrying the fingers 24 adapted to project into holes 25 in the chasers to permit the guides to force the chasers radially outward. The grooves 15 and holes 17 are connected by slots 23 which permit the fingers 24 on the guides 18 to extend into the holes 25 and permit radial movement of these parts.

In the present construction the fingers 24 are pivoted to the ends of guides 18 as at 24ᵃ and the outward movement of the guides is limited by the heads of screws 20 in suitable holes alongside of holes 17 and intersecting the latter, the guides 18 being provided with a flattened portion 18ᵃ and shoulder (not shown).

Also, in the present construction, the chasers 16 are retained in grooves 15 by means of a ring 26 secured as by suitable screws to the end of body 10, being, if desired, positioned by means of pilot pins 29 before inserting the screws.

The control sleeve 31 is slidable on the body 10 and is generally cylindrical in shape with a conical inner surface 32 at its outer end, the angle of which is the same as the angle of the outer ends 33 of the chasers. This sleeve is moved manually outward and forces the chasers inwardly because of the inclination of their engaging surfaces. Sleeve 31 has an internal radial flange 35 against which small plungers 36 are pressed by the springs 37 seated in longitudinal holes 38 in the body. The action of these springs is to force back the sleeve 31 when released and permit the springs 22 to move the chasers 16 outwardly.

The rear end 39 of the sleeve 31, the flange 35 and the rear cap 40 which is secured to end 39 as by screws (not shown) constitute a chamber for the trip ring 43 which has a finger 44 projecting out through a suitable notch in the end 39. A spring, shown in section at 46 normally pushes this finger 44 outward.

The adjusting nut 48 preferably has a circumferential flange 49 provided with holes 50 to receive a spanner wrench or other tool by means of which it may be turned. The adjusting nut 48 extends into the trip ring 43 and has a circumferential shoulder 57 adapted to be engaged thereby and to receive the thrust of this ring and of the sleeve 31.

It will be noted that the distance between flange 49 of the adjusting nut 48 and rear cap 40 is a little greater than the depth of the chasers 16, so that when the ring 43 is moved to permit the springs 37 to push back the sleeve 31 and release the chasers, the latter will be cleared by the forward end of the sleeve and may be easily removed from the grooves 15, the removal being permitted by the pivoted pins 24. In ordinary operation, however, it is not necessary or desirable to entirely release the chasers 16 but only to allow the guides 18 to withdraw them from the work. Therefore a removable spacer ring 60 is placed in the position indicated in Fig. 1 between flange 49 and cap 40. With this ring in place, the movement of sleeve 31 upon release by ring 33 is only sufficient to allow withdrawal of the chasers from the work sufficiently to allow the latter to be removed.

Figure 2:
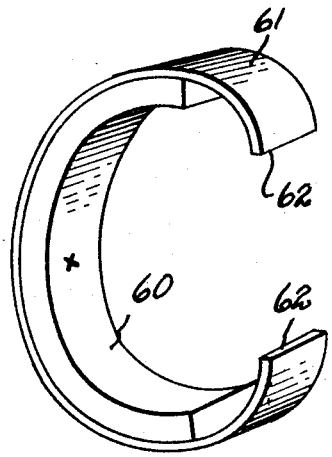
Fig. 2, is a perspective view of the spacer ring.
Figure 3:
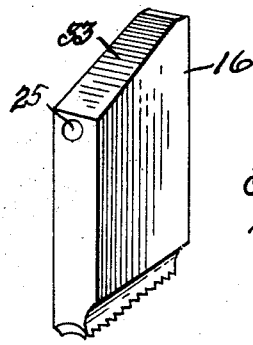
Fig. 3, is a similar view of one of the chasers.

Ring 60, best shown in Fig. 2, consists of a semi-cylinder 60 adapted to fit snugly about the shank of nut 48, with a spring member 61 secured to the outside thereof at its mid point, being free for the remainder of its length. Spring 61 is somewhat longer than piece 60 and is bent inwardly at its ends 62 to contact with the shank of nut 48 to hold the spacer in place but permit its easy removal.

The operation of the device appears obvious from its construction and need not be described further.

Having now described the invention and the preferred form of embodiment thereof it is to be understood that the said invention is not to be limited to the specific details herein set forth and illustrated but only by the scope of the claims which follow.

I claim:—

1. In a die comprising a cylindrical body having radial grooves in its forward end, spring pressed chasers slidable in said grooves and means for retaining said chasers in said grooves, a spring pressed sleeve slidable longitudinally on the body to fix the radial position of said chasers in said grooves, means to release said sleeve and permit it to move longitudinally whereby to allow said chasers to move radially outward and to be removed from said grooves, a stop for said sleeve, and a removable spacer ring between said stop and sleeve whereby the movement of said sleeve may be limited to permit withdrawal of the chasers from the work while retaining them in the grooves.

2. A die consisting of a cylindrical body having radial grooves in its forward end and plungers spring pressed outwardly adjacent to and parallel with said grooves, said plungers having fingers pivotally connected thereto and extending into said grooves, chasers slidably mounted in said grooves and provided with holes to receive said fingers, means co-operating with the outer ends of said chasers to fix their radial position, means to control said co-operating means for normal operation and other means permitting removal of said co-operating means whereby said chasers may be withdrawn radially outward from said grooves.

3. A die consisting of a cylindrical body having radial grooves in its forward end, chasers slidable radially in said grooves and spring pressed outwardly, said chasers having inclined faces at their outer ends, a sleeve slidably mounted on said body and provided within its forward end with an inclined surface adapted to co-operate with the inclined surfaces on said chasers to adjustably fix the radial position of the latter, means to cause sliding of said sleeve to a position in which the two inclined surfaces no longer co-operate and a spacer at the rear of said sleeve to limit the sliding movement to such position that the inclined surfaces are still in contact but in which the chasers are outside of the fixed adjusted position.

ALBERT J. PRANCE.